(12) United States Patent
Nakamura et al.

(10) Patent No.: US 11,039,082 B2
(45) Date of Patent: Jun. 15, 2021

(54) IMAGE CAPTURING APPARATUS, CONTROL METHOD THEREOF, AND STORAGE MEDIUM

(71) Applicant: CANON KABUSHIKI KAISHA, Tokyo (JP)

(72) Inventors: Hinako Nakamura, Kawasaki (JP); Nobukazu Yoshida, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 21 days.

(21) Appl. No.: 16/688,703

(22) Filed: Nov. 19, 2019

(65) Prior Publication Data
US 2020/0169658 A1 May 28, 2020

(30) Foreign Application Priority Data

Nov. 27, 2018 (JP) .............................. JP2018-221683
Nov. 27, 2018 (JP) .............................. JP2018-221684

(51) Int. Cl.
*H04N 5/235* (2006.01)
*G06T 5/00* (2006.01)

(52) U.S. Cl.
CPC ........... *H04N 5/2357* (2013.01); *G06T 5/007* (2013.01); *H04N 5/2353* (2013.01); *H04N 5/2355* (2013.01); *G06T 2207/20208* (2013.01)

(58) Field of Classification Search
CPC .......................... H04N 5/2357; H04N 5/2355
See application file for complete search history.

(56) References Cited

U.S. PATENT DOCUMENTS 8,749,664 B2 * 6/2014 Nakaoka .............. H04N 5/2357
348/228.1
8,890,975 B2 * 11/2014 Baba ..................... H04N 5/235
348/228.1

(Continued)

FOREIGN PATENT DOCUMENTS

JP 2009-017213 A 1/2009
JP 2014-179924 A 9/2014

(Continued)

OTHER PUBLICATIONS

Y. Yoo, J. Im and J. Paik, "Flicker removal for CMOS wide dynamic range imaging based on alternating current component analysis," in IEEE Transactions on Consumer Electronics, vol. 60, No. 3, pp. 294-301, Aug. 2014, doi: 10.1109/TCE.2014.6937311. (Year: 2014).*

*Primary Examiner* — John Villecco
(74) *Attorney, Agent, or Firm* — Cowan, Liebowitz & Latman, P.C.

(57) ABSTRACT

An image capturing apparatus, comprising: an image sensor configured to capture an image of a subject and output image signals, a dividing unit configured to vertically divide the image signals into a plurality of regions, a detection unit configured to detect flicker based on a signal level of each of the plurality of regions, and a control unit configured to cause a plurality of image captures with different exposure conditions to be performed using the image sensor, wherein the detection unit, by adjusting a phase of a flicker appearing in each of the plurality of image signals obtained by the plurality of image captures, detects a flicker from the plurality of image signals.

11 Claims, 6 Drawing Sheets

(56) References Cited

U.S. PATENT DOCUMENTS

| | | | | |
|---|---|---|---|---|
| 9,167,173 B2* | 10/2015 | Koizumi | | H04N 5/2355 |
| 9,232,153 B2* | 1/2016 | Elhachimi | | H04N 5/2356 |
| 9,407,832 B2* | 8/2016 | Peng | | H04N 5/2357 |
| 9,686,488 B2* | 6/2017 | Barna | | H04N 5/3745 |
| 10,244,191 B2* | 3/2019 | Barna | | H04N 5/2327 |
| 10,412,312 B2* | 9/2019 | Hilldore | | H04N 5/2353 |
| 10,432,875 B2* | 10/2019 | Nakamura | | H04N 5/2357 |
| 10,447,923 B2* | 10/2019 | Shintani | | H04N 5/23287 |
| 10,721,415 B2* | 7/2020 | Wang | | H04N 5/265 |
| 10,735,669 B2* | 8/2020 | Dewhurst | | H04N 5/2357 |
| 2014/0375848 A1* | 12/2014 | Yamamoto | | H04N 5/2353 |
| | | | | 348/241 |
| 2018/0324344 A1* | 11/2018 | Kinoshita | | H04N 5/2355 |
| 2019/0166298 A1* | 5/2019 | Tasdizen | | H04N 5/2357 |
| 2019/0208106 A1* | 7/2019 | Lukac | | G06T 5/20 |
| 2020/0077009 A1* | 3/2020 | Nakamura | | H04N 5/23232 |
| 2020/0092459 A1* | 3/2020 | Bitan | | H04N 5/2357 |
| 2020/0177788 A1* | 6/2020 | Jiang | | H04N 5/35563 |
| 2020/0221028 A1* | 7/2020 | Kobayashi | | H04N 5/2357 |
| 2020/0344398 A1* | 10/2020 | Fruchtman | | H04N 5/23229 |

FOREIGN PATENT DOCUMENTS

| | | | | |
|---|---|---|---|---|
| JP | 2017188837 A | * | 10/2017 | |
| WO | WO-2017212870 A1 | * | 12/2017 | H01L 27/146 |

* cited by examiner

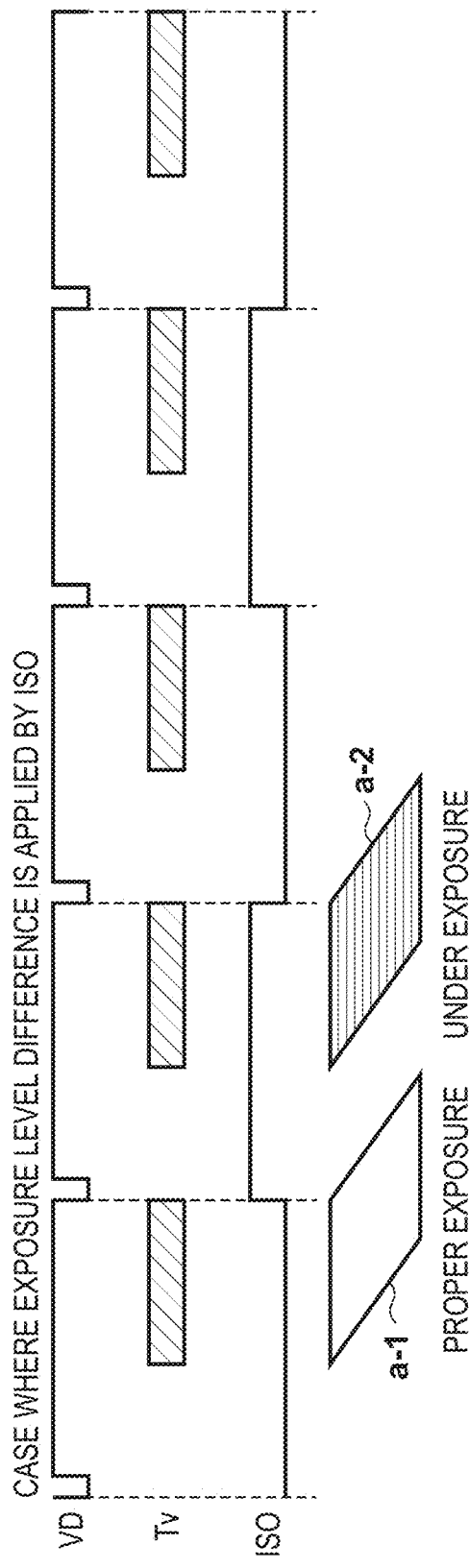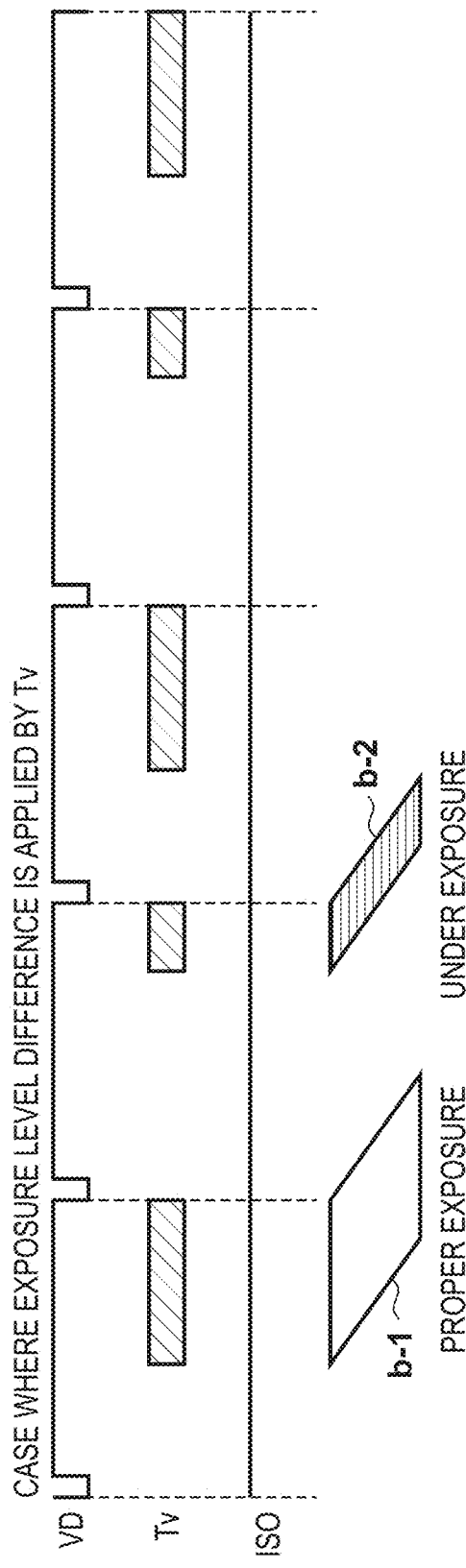

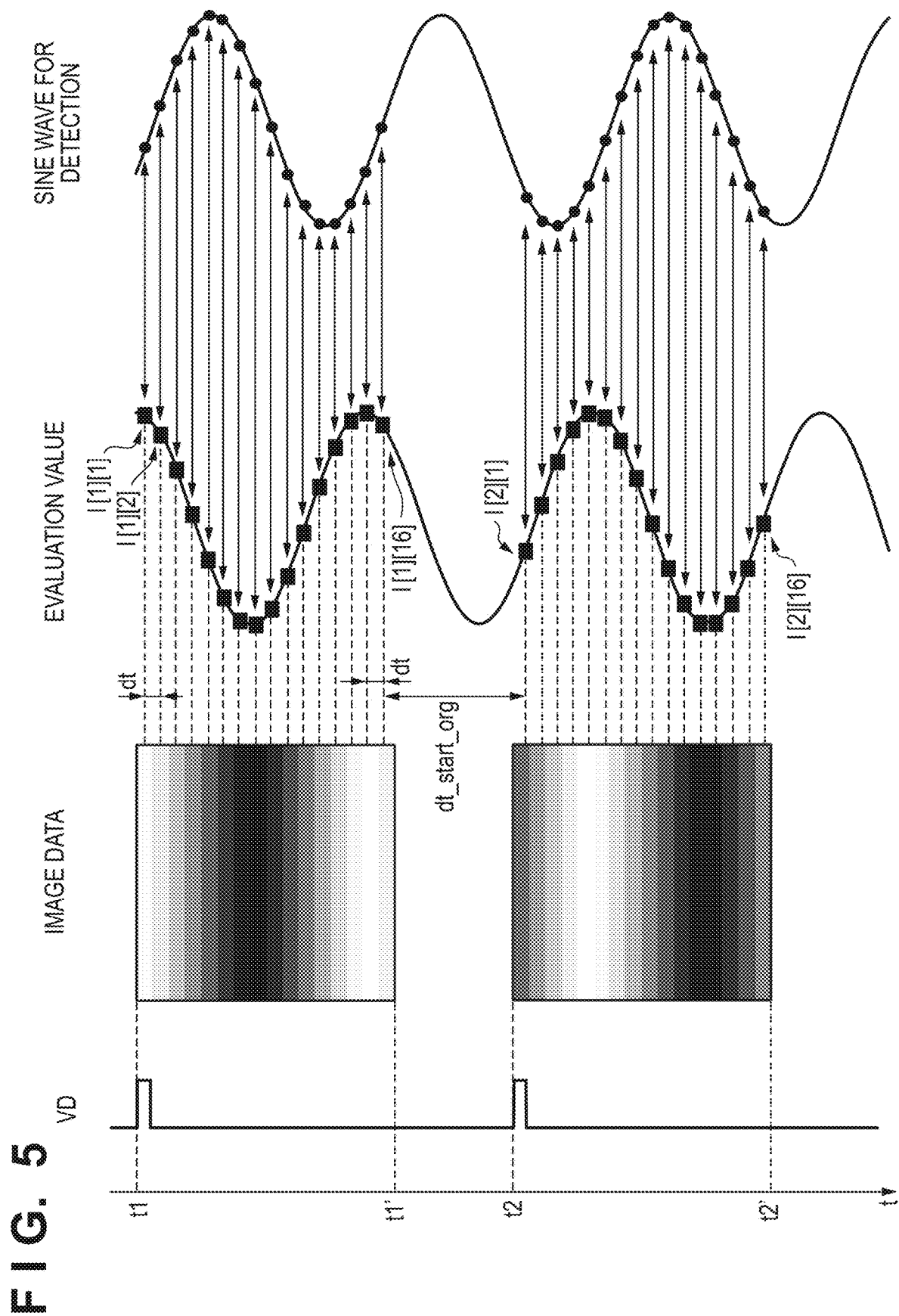

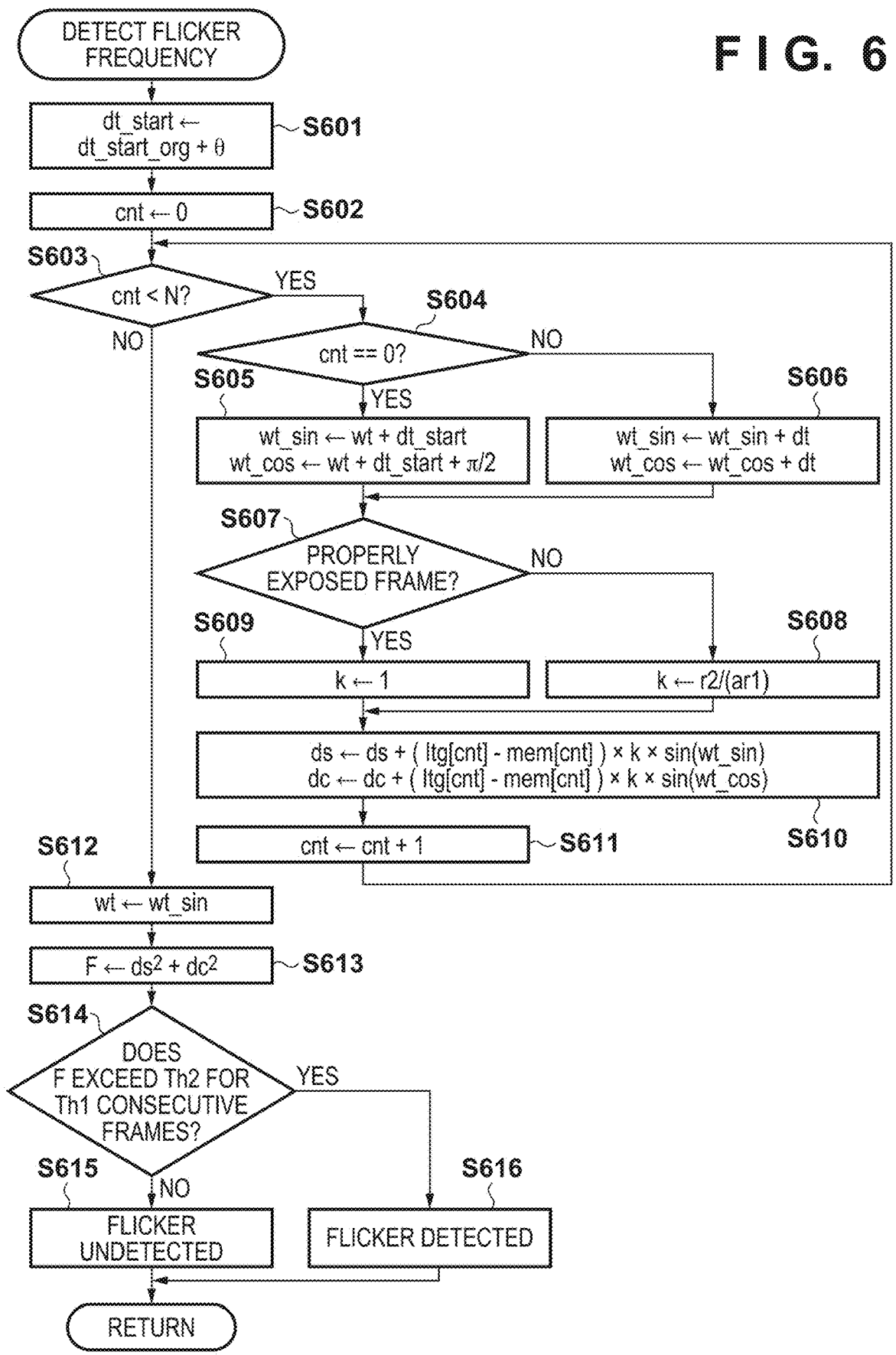

IMAGE CAPTURING APPARATUS, CONTROL METHOD THEREOF, AND STORAGE MEDIUM

BACKGROUND OF THE INVENTION

Field of the Invention

The present invention relates to a technique for capturing HDR moving images under a flickering light source.

Description of the Related Art

A global shutter and a slit rolling shutter are methods of an electronic shutter of an image sensor. When image capture is performed under a flickering light source these methods, in the former case, a so-called surface flicker occurs in which the brightness of the entire image changes due to the influence of the flicker, and in the latter case, a so-called line flicker occurs in which a brightness difference occurs within one image obtained by capturing an image of a subject. Techniques of detecting and correcting the flicker which occurs due to each shutter method in order to reduce the influence of the flicker are already known. For example, Japanese Patent Laid-Open No. 2009-17213 discloses a detection method and a correction method for a line flicker generated by a slit rolling shutter.

In recent years, HDR (High Dynamic Range) combination, in which images captured under a plurality of exposure conditions are combined in order to express tones exceeding the dynamic range of the image sensor has been proposed, and an HDR moving image technique in which combination images are recorded as a moving image has also been proposed. One method for generating an HDR moving image consecutively perform charge accumulations under a combination of one or a plurality of exposure conditions with a predetermined exposure level difference with respect to a reference luminance (for example, a proper exposure, an underexposure that is underexposed by two levels with respect to proper exposure, and the like), to combine the images that are read, and record the combination as one frame of the moving image. Japanese Patent Laid-Open No. 2014-179924 proposes a technique relating to a method for detecting flicker and correcting it which is specialized for such HDR moving image driving.

A flicker detection method described in Japanese Patent Laid-Open No. 2009-17213 is a method for detecting flicker by extracting an image signal that is steady in the time direction using images that are consecutively captured, and extracting blink components of the flicker by dividing an image of one captured frame. However, when such flicker detection is performed in an image capturing mode in which capturing is consecutively performed under different exposure conditions, as with a HDR moving image, the result of detection of the flicker will not be stable because the brightness of the image signal differs in the time direction. In the flicker detection method described in Japanese Patent Laid-Open No. 2014-179924, there has been proposed a technique for detecting flicker by providing an extractor for extracting a flicker component for each exposure condition (for example, proper exposure, and underexposed by two levels, or the like).

However, in the case where a flicker detector is provided for each exposure condition, there is problems in that the hardware configuration and the size of memory increase when the exposure conditions to be combined increase.

SUMMARY OF THE INVENTION

The present invention has been made in view of the above-mentioned problems, and detects flicker while suppressing an increase in the size of the hardware configuration and the size of the memory in a case where HDR moving image capture is performed under a flickering light source.

According to a first aspect of the present invention, there is provided an image capturing apparatus comprising an image sensor configured to capture an image of a subject and output an image signal and at least one processor or circuit configured to function as the following units: a dividing unit configured to vertically divide the image signal into a plurality of regions; a detection unit configured to detect a flicker based on a signal level of each of the plurality of regions; a control unit configured to control so as to cause a plurality of image captures with different exposure conditions to be performed using the image sensor, wherein the detection unit, in a case where the plurality of image captures are performed, by adjusting a phase of a flicker appearing in each of the plurality of image signals obtained by the plurality of image captures, detects a flicker from the plurality of image signals.

According to a second aspect of the present invention, there is provided a method for controlling an image capturing apparatus comprising an image sensor configured to capture an image of a subject and output image signals, the method comprising: vertically dividing the image signals into a plurality of regions; detecting a flicker based on a signal level of each of the plurality of regions; controlling so as to cause a plurality of image captures with different exposure conditions to be performed using the image sensor, wherein in the detecting, in a case where the plurality of image captures are performed, by adjusting a phase of a flicker appearing in each of the plurality of image signals obtained by the plurality of image captures, a flicker from the plurality of image signals is detected.

Further features of the present invention will become apparent from the following description of exemplary embodiments with reference to the attached drawings.

BRIEF DESCRIPTION OF THE DRAWINGS

FIGS. 3A and 3B are views illustrating combinations of exposure conditions in HDR moving image mode.

FIG. 5 is a view for describing a flicker frequency detection process according to the embodiment.

FIG. 6 is a flow chart illustrating a flicker frequency detection process in the embodiment.

DESCRIPTION OF THE EMBODIMENTS

Hereinafter, an embodiment of the image capturing apparatus of the present invention will be described in detail with reference to the accompanying drawings.

<Configuration of Image Capturing Apparatus>

Figure 1:
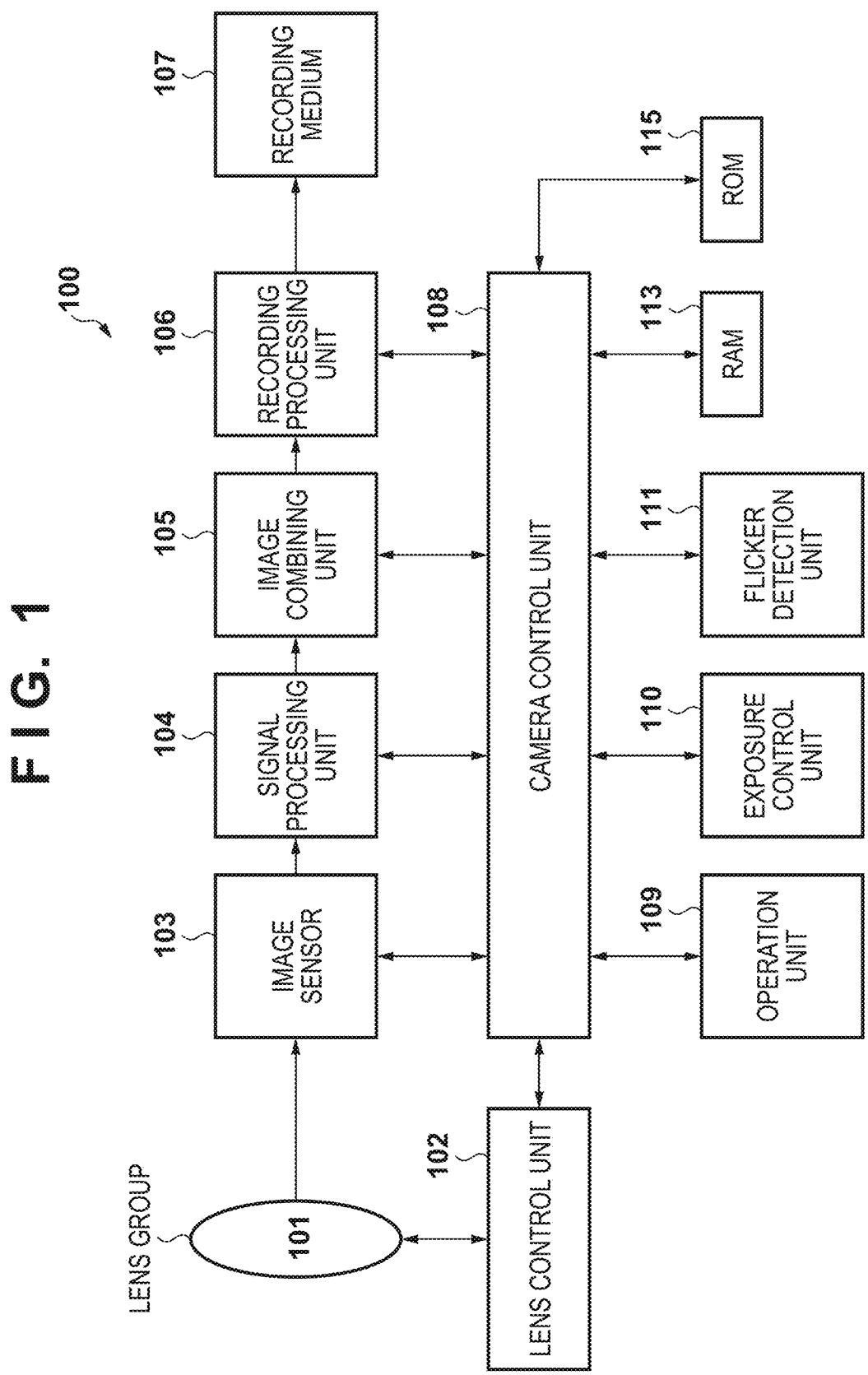
FIG. 1 is a block configuration illustrating the configuration of a digital camera which is an embodiment of an image capturing apparatus of the present invention.

FIG. 1 is a block configuration illustrating a digital camera 100 which is an embodiment of an image capturing apparatus of the present invention.

A lens group 101, including a mechanism for controlling exposure by a diaphragm or a neutral density filter, and a mechanism for controlling a focusing operation or a zooming operation, causes incident light to focus on an image sensor 103 forming an optical image (subject image). The formed optical image is converted into an electric signal by the image sensor 103, and is outputted to a signal processing unit 104. At this time, the exposure of the captured image is controlled by driving the diaphragm included in the lens group 101, changing a neutral density filter, controlling an accumulation time for the image sensor 103, controlling the amplification factor of the electric signal, and the like. The signal processing unit 104 performs luminance correction such as gain correction, color correction such as white balance correction, and other signal processing on the obtained image signal, and outputs the processed image signal to an image combining unit 105. The image combining unit 105 generates an HDR (High Dynamic Range) image having an enlarged dynamic range by using a plurality of images inputted in chronological order and outputs the images to a recording processing unit 106.

At this time, the image combining unit 105 performs luminance matching by performing nonlinear tone conversion processing according to the difference in exposure of the images inputted chronologically, determines a combining ratio from the luminance values of the corresponding pixels therebetween, and performs combining for each pixel. When performing a combination from a plurality of images inputted in chronological order, it is necessary to first store the images in a storage region. A recording region for storing image signals may exist anywhere, for example, a storage region for holding inputted images may be provided inside the image combining unit 105, and may be used for combining the images inputted in chronological order.

In addition, although an HDR moving image is described in a present embodiment, it is of course possible to operate in a normal camera mode. In this case, configuration may be such that inputted images are outputted as is rather than the images being combined in the image combining unit 105. In this case, configuration may be such that, for example, an electronic device such as an external client device generates an HDR moving image based on images outputted from the digital camera 100.

An image signal of a recordable format outputted from the recording processing unit 106 through the above-described processing is recorded on a recording medium 107. The flow of the series of image processes is executed by controlling each block by a camera control unit 108. The camera control unit 108 comprises a microcomputer, and controls the entire digital camera 100 by loading and executing control programs stored in a ROM 115 on a RAM 113. The RAM 113 is also used as a work area of the camera control unit 108.

The camera control unit 108 receives an operation from a user through an operation unit 109, and sets parameters relating to zoom, focus, and brightness of a captured image in accordance with a set capture mode and brightness of a subject. The set parameters are transmitted to a lens control unit 102 and an exposure control unit 110, and the respective blocks are controlled so as to be in a control position and a control state corresponding to the set values. A flicker detection unit 111 receives the captured images accumulated by the image sensor 103 as an input, and detects a flicker interval (light amount change interval) from an interval at which brightness changes in a plurality of temporally consecutive image data (for example, previous and subsequent image data). Details of detection of a flicker interval will be described later.

<Detection of Flicker>

Figure 2:
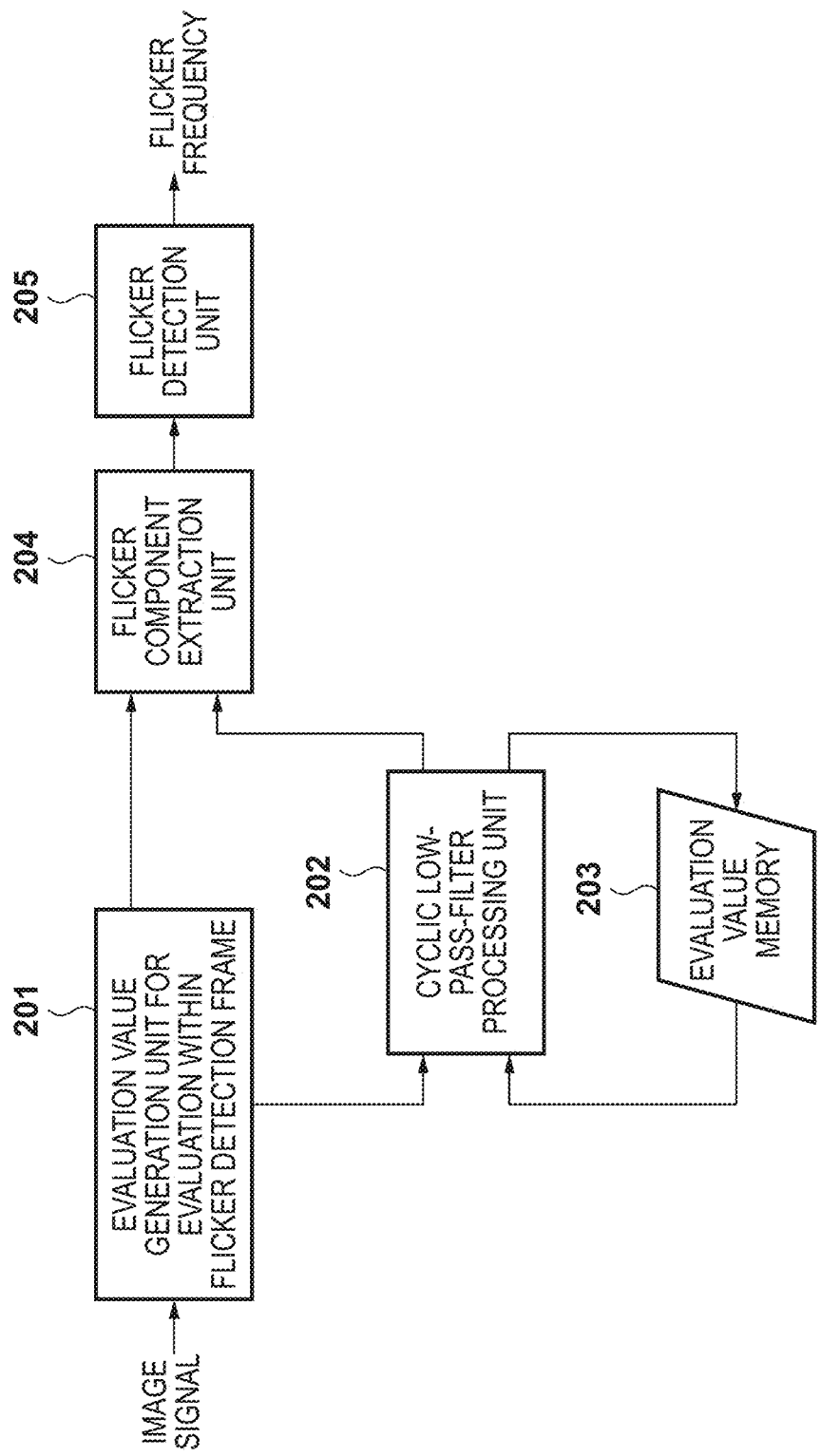
FIG. 2 is a block diagram illustrating a configuration of a flicker detection unit according to an embodiment.

Next, FIG. 2 is a block diagram illustrating a configuration of the flicker detection unit 111. An operation of detecting flicker will be described with reference to FIG. 2.

When an image signal is inputted to the flicker detection unit 111 via the camera control unit 108, an evaluation value frame for calculating a signal value of a color component is set in an evaluation value generation unit 201. In an image captured by an image sensor of a rolling shutter type, since the timing of the start of exposure and the timing of the end of exposure differ for each horizontal line, the difference in brightness caused by blinking of a light source differs for each horizontal line. Therefore, luminance values in the vertical direction are affected by the blinking of the environmental light and the flickering light source, and differences occur among their average luminances (signal level). In order to extract a flicker component from the luminance value, a cyclic low-pass-filter processing unit 202 performs the following calculation to extract a steady signal component (environmental light) in the time direction.

$$\text{mem} = \text{ave} \times k + \text{mout} \times (1-k) \qquad \text{(Equation 1)}$$

Here, mem is a value stored in an evaluation value memory 203 as an output of the above equation, and ave represents an output result of the evaluation value generation unit 201. k is a filter coefficient of the cyclic low-pass-filter processing unit 202, and mout is a calculation result of the above equation calculated when a signal value of an image of the preceding one frame is inputted. By performing the above calculation for each horizontal line of the input image, it is possible to extract a steady signal component in the time direction.

A flicker component extraction unit 204 calculates the flicker component (level variation component of the input image signal) by calculating the ratio or difference between the signal value of the horizontal line of the newly inputted image and the steady signal component extracted by the cyclic low-pass-filter processing unit 202. From the calculated flicker component, a flicker detection unit 205 generates a flicker model which is a characteristic of variation in the level of the signal in the vertical direction.

The flicker model is a model in which a luminance variation due to flicker is approximated as a periodic function having a specific amplitude w in the vertical direction, frequency f, and phase θ, for example. Since a voltage variation of an AC power supply has the characteristic of a trigonometric function, a sine wave (or cosine wave) is generally used as a periodic function as the model, but another periodic ideal function may be used. The frequency f is determined by the frame rate and power supply frequency of the light source. The phase θ can be calculated for each row when the variation ratio of the detected variation component is 1, and the phase θ=0 for a row in which the variation amount of the variation ratio in the vertical direction is 1. The amplitude w is calculated from the variation ratio of the calculated phases at $\pi/2$ and $3\pi/2$.

<HDR Moving Image>

Next, driving control of the HDR moving image will be described with reference to the FIGS. 3A and 3B.

As described above, the HDR moving image is an image capturing mode in which image capture is consecutively performed a plurality of times under one or a plurality of exposure conditions in which a predetermined exposure level difference is applied with respect to a reference exposure, and read image signals are combined and recorded as one frame of the moving image. FIG. 3A illustrates a case where the exposure level difference is applied by the sensitivity (hereinafter referred to as ISO), and FIG. 3B illustrates a case where the exposure level difference is applied by the accumulation time (hereinafter referred to as Tv). The a-1 frame and the a-2 frame and the b-1 frame and the b-2 frame are combination pairs when generating one frame to form an HDR moving image, and are combined by the image combining unit 105 and outputted as an image of one frame.

<Operation of Image Capturing Apparatus>

Figure 4:
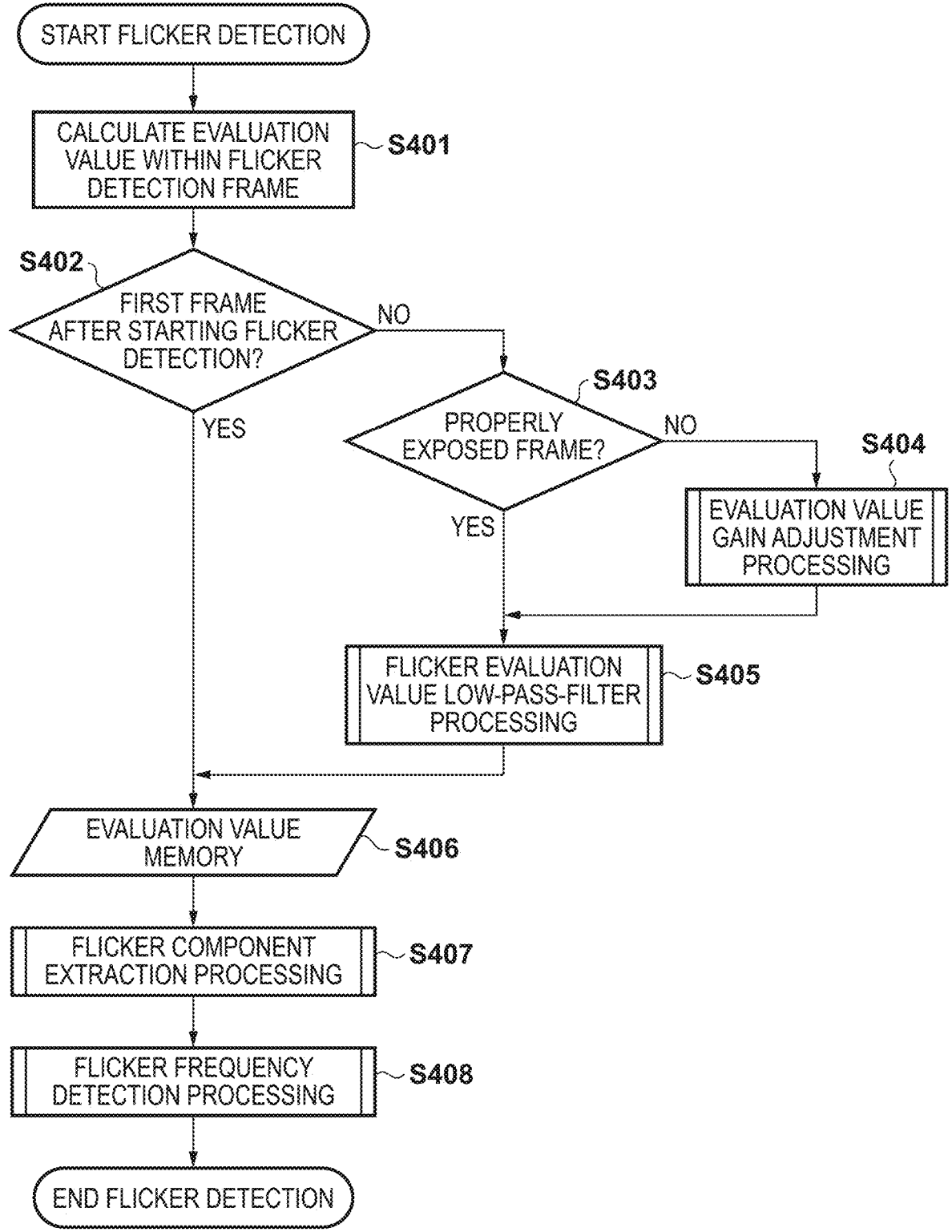
FIG. 4 is a flow chart illustrating a flicker detection operation in the embodiment.

FIG. 4 is a flow chart illustrating a flicker detection operation in the embodiment. With reference to FIG. 4, a description will be given of a flicker detection method in the case where an exposure level difference is provided by Tv (accumulation time) in an HDR moving image. Note, a case where the exposure level difference is made by Tv (accumulation time) will be described, but even in a case where the exposure level difference is applied by ISO sensitivity, the flicker can be detected in exactly the same manner as in FIG. 4.

When the HDR moving image mode is started and the flicker detection is started, the evaluation value generation unit 201 sets an evaluation frame for obtaining an average value of the respective color signals with respect to the captured image signals in step S401.

In step S402, the camera control unit 108 determines whether or not the current frame is the first frame after starting flicker detection, and if the current frame is the first frame, the process proceeds to step S406 and the evaluation value obtained by the evaluation value generation unit 201 is held in the evaluation value memory 203. In a case where it is determined in step S402 that the current frame is for an accumulation timing corresponding to a second or subsequent frame after flicker detection is started, the process proceeds to step S403, and the camera control unit 108 determines whether or not the inputted image signal is of a reference exposure condition for the HDR moving image. In FIG. 4, a case where the reference exposure condition is a proper exposure is illustrated.

In step S403, when it is determined that the inputted image signal is a captured image obtained by a proper exposure (properly exposed frame), the process proceeds to step S405. Details of the processing in step S405 are the same as those described in the operation of the cyclic low-pass-filter processing unit 202 in FIG. 2, and therefore descriptions thereof are omitted.

In step S403, in a case where the captured image (image signal) has a predetermined exposure level difference with respect to the proper exposure instead of being a properly exposed frame, the evaluation value generation unit 201 performs an evaluation value gain adjustment process in step S404. Here, processing is performed to apply gain to the evaluation value proportionally to an exposure level difference from the reference frame, and for example, in the case where the input image signal is a two level underexposed exposure condition with respect to the reference frame, the signal is amplified multiplying the evaluation value with its inverse which is four times the gain. When the gain adjustment processing of the evaluation value is completed, the cyclic low-pass-filter processing unit 202 performs the low-pass-filter processing in step S405.

When the processing of step S405 is completed, in step S406, the camera control unit 108 holds the evaluation value as an output of the cyclic low-pass-filter processing unit 202 in the evaluation value memory 203. Thereafter, the process proceeds to step S407, and the flicker component extraction unit 204 extracts the flicker component from the difference between the evaluation value of the input image signal and the evaluation value held in step S406. Details of the processing in step S407 are the same as those described in the operation of the flicker component extraction unit 204 of FIG. 2, and therefore descriptions thereof are omitted.

When the extraction of the flicker components is completed, the process proceeds to step S408, in which the flicker detection unit 205 determines the frequency of the extracted flicker (that is, the light amount change interval of the flicker) and ends the flicker detection. The flicker frequency detection processing will be described later with reference to FIGS. 5 and 6. Note that this detection result is fed back to the Tv (accumulation time) and image processing in order to remove the flicker, and the result is the appearance of frames from which the flicker has disappeared, but flicker detection is not performed for those frames and detection is continued in frames in which flicker appears.

The flicker frequency (light amount change interval) detection processing in step S408 of FIG. 4 will be described with reference to FIG. 5. The vertical axis is a time axis, and VD is a vertical synchronization signal. FIG. 5 illustrates a state in which image data of a first frame is read from time t1 to time t1', and image data of a second frame is read from time t2 to time t2'. In a case where the subject is under a flickering light source, a luminance change occurs in every line as in FIG. 5 for the image data. When the power supply frequency is f [Hz], the luminance change of the flickering light source can be modeled as:

$$L(t) = A \sin^2(2\pi f t) dt \ (A \text{ is a constant}).$$

The signal value in a case where this is accumulated for the time $\Delta t$, from time $(t-\Delta t)$ to $t$, is $$\int_{t-\Delta t}^{t} L(t) dt = \frac{A}{2} \Delta t + \frac{Ar}{8\pi f} \sin(2\pi(2f)t + \theta) \quad (2)$$

and is a signal having a frequency 2f [Hz]. Here, $$r = \sqrt{\sin^2 4\pi f \Delta t + (1 - \cos 4\pi f \Delta t)^2} \quad (3)$$

$$\cos\theta = \frac{\cos 4\pi f \Delta t - 1}{r}, \ \sin\theta = \frac{-\sin 4\pi f \Delta t}{r}. \quad (4)$$

By detecting this frequency component from the image data, the presence or absence of a flicker of the power supply frequency of f [Hz] is detected.

For this purpose, in step S401, the evaluation value generation unit 201 sets an evaluation frame for each of the regions obtained by dividing the image read for every frame into N parts in the vertical direction, and obtains the average value of the signal for each divided region. In FIG. 5, the average value of the divided region n (1≤n≤N) obtained from the image read in an m-th frame is denoted as I[m][n], where N=16. This I[m][n] is used as an evaluation value for flicker detection.

In a case of detecting the presence or absence of flicker at the power supply frequency of f [Hz], the flicker level is calculated from the value of I[m][n] and the value of the sine wave (and the cosine wave) at the corresponding 2f [Hz].

Also, it is determined that flicker is present when a frame whose flicker level exceeds a predetermined value continues for a predetermined frame.

FIG. 6 is a flow chart illustrating the detailed operation of the flicker frequency detection processing in step S408 of FIG. 4.

In step S601, the flicker detection unit 205 sets a variable dt_start. dt_start is a value indicating how far the phase of the sine wave of 2f [Hz] advances between the last evaluation value of the frame m and the first evaluation value of the frame m+1. Based on dt_start_org which is determined by the read mode of the image sensor, dt_start is set to a value obtained by adding θ which depends on the accumulation time. Regarding dt_start_org, when, as illustrated in FIG. 5, it takes R [ms] to read an image at a frame rate F [fps], for example, $$dt\_start\_org = \{1/F - R \times (N-1)/N\} \times 4\pi f.$$

If the accumulation time is the same between frames, since no phase shift occurs between the frames, there is no problem if dt_start=dt_start_org. However, as illustrated in (Equation 2) and (Equation 4), the flicker component of the image signal is phase shifted by θ depending on the accumulation time, and therefore, it is necessary to adjust the phase according to the accumulation time. Therefore, a θ which satisfies (Equation 4) is obtained according to the accumulation time, and by reflecting this in dt_start, the phase shift is adjusted so that flicker detection is possible even in a case where the accumulation time differs for each frame as in an HDR moving image.

For example, in a case where a power supply frequency flicker of 50 [Hz] is to be detected at an accumulation time of 1/120 [s], $$\text{when } 4\pi f \Delta t = 4\pi \times 50/120 = 5/3 \times \pi$$

is substituted into (Equation 4), since cos θ=−½ and sin θ=(√3)/√2, θ=(⅔)×π.

When the setting of dt_start is finished in step S601, the flicker detection unit 205 first initializes a variable cnt to 0 in step S602 before looping to process the N evaluation values.

In step S603, the camera control unit 108 determines whether or not cnt is smaller than N, and if cnt is smaller than N, the process proceeds to step S604 so as to continue the loop, and if cnt is greater than or equal to N, the process proceeds to step S612.

In step S604, the camera control unit 108 determines whether or not cnt is 0, and if cnt is 0, the process proceeds to step S605 so as to perform a process for the first time of the loop, and if cnt is not 0, the process proceeds to step S606.

In step S605, the flicker detection unit 205 sets variables wt_sin and wt_cos. wt_sin indicates the phase of a sine wave of 2f [Hz] corresponding to the evaluation value, and wt_cos indicates the phase of a cosine wave of 2f [Hz] corresponding to the evaluation value.

In step S605, the flicker detection unit 205 adds dt_start to wt which was stored in the previous frame to obtain wt_sin in order to generate a phase for the first evaluation value (I[m][1] in FIG. 5) in the frame. Although described later, since the phase corresponding to the last evaluation value of the previous frame is stored in wt in step S612, the phase corresponding to the first evaluation value can be obtained by adding dt_start to that. Also, a cosine wave is expressed by setting a value obtained by shifting the phase of wt_sin by π/2 to wt_cos.

Except for the first evaluation value of the frame, wt_sin and wt_cos are set in step S606. In step S606, the flicker detection unit 205 updates wt_sin and wt_cos by adding dt to wt_sin and wt_cos at that point in time. As illustrated in FIG. 5, dt corresponds to the time for reading out one of the divided regions, and is a value determined by the read mode of the sensor, and for example, when it takes R [ms] to read an image, $$dt = R/N \times 4\pi f$$

may be set.

In step S607, similarly to step S403, the camera control unit 108 determines whether or not the frame is a properly exposed frame, and if the frame is not a properly exposed frame, the process proceeds to step S608 and variable k is set. k is a coefficient to be multiplied by an evaluation value of a frame, which was not properly exposed, in order to adjust a deviation of amplitude due to a difference in accumulation time between a properly exposed frame and the frame that was not properly exposed. Here, it is assumed that the accumulation time of a frame which was not properly exposed in the HDR moving image is $\Delta t1$, and the accumulation time of a frame which was properly exposed is $\Delta t2 = a\Delta t1$. Thus, when a signal value other than the flicker component of the frame which was not properly exposed is E1, the signal value other than the flicker component of the properly exposed frame becomes E2=aE1, and the signal value S1 of the image data of the frame which was not properly exposed is combined with the flicker component of (Equation 2), $$S1 = \frac{A}{2}\Delta t1 + \frac{Ar1}{8\pi f}\sin(2\pi(2f)t + \theta 1) + E1$$

and the signal value S2 of the image data of the properly exposed frame can be expressed as, $$S2 = \frac{A}{2}\Delta t2 + \frac{Ar2}{8\pi f}\sin(2\pi(2f)t + \theta 2) + E2 = \frac{aA}{2}\Delta t1 + \frac{Ar2}{8\pi f}\sin(2\pi(2f)t + \theta 2) + aE1.$$

Here, $$r1 = \sqrt{\sin^2 4\pi f \Delta t1 + (1 - \cos 4\pi f \Delta t1)^2}$$
$$\cos\theta 1 = \frac{\cos 4\pi f \Delta t1 - 1}{r1}, \sin\theta 1 = \frac{-\sin 4\pi f \Delta t1}{r1}$$

$$r2 = \sqrt{\sin^2 4\pi f \Delta t2 + (1 - \cos 4\pi f \Delta t2)^2}$$
$$\cos\theta 2 = \frac{\cos 4\pi f \Delta t2 - 1}{r2}, \sin\theta 2 = \frac{-\sin 4\pi f \Delta t2}{r2}.$$

The equation is modified as follows:

$$aS1 - \frac{aA}{2}\Delta t1 - aE1 = \frac{aAr1}{8\pi f}\sin(2\pi(2f)t + \theta 1)$$

-continued $$S2 - \frac{aA}{2}\Delta t1 - aE1 = \frac{Ar2}{8\pi f}\sin(2\pi(2f)t + \theta 2)$$

Therefore, the DC component aA/2Δt1+aE1=A/2Δt2+E2 is obtained from the evaluation value of the properly exposed frame and a times the evaluation value of the frame that was not properly exposed, and a component from which this is removed is corrected by using r2/(ar1). As a result, it can be understood that the amplitude shifted by the difference in the accumulation time can also be made uniform and that stable flicker detection becomes possible.

Since the gain multiplied in step S404 corresponds to a, mem (refer to (Equation 1)) stored in the evaluation value memory through step S403 to step S406 corresponds to the DC component here. Based on this consideration, r2/(ar1) is obtained, according to the equation, from the accumulation time of the properly exposed frame and the accumulation time of the frame which was not properly exposed, and is set to k. In the case of a slow shutter speed, k is set to 1 in step S609. This processing means that the evaluation value is used as is without being multiplied by the coefficient for amplitude adjustment in the calculation in which the evaluation value of the properly exposed frame was used.

In step S610, the flicker detection unit 205 multiplies the evaluation value and the sine wave and the cosine wave of the frequency 2f [Hz] by using the phases wt_sin and wt_cos set in step S605 and step S606, and integrates them. Itg[cnt] is an evaluation value obtained in this frame and mem[cnt] is a steady signal component stored in the evaluation value memory in step S406, and these are obtained and stored for each of the N divided regions. The result of multiplying the value obtained by subtracting the steady signal component from the evaluation value by the coefficient k and the sine wave (sin(wt_sin)) is added to ds, and the result of multiplying the value obtained by subtracting the steady signal component from the evaluation value by the coefficient k and the cosine wave (sin(wt_cos)) is added to dc. The values ds and dc are initialized to 0 at the time of starting the camera, and the above integration processing is performed each time an evaluation value is obtained.

When the updating of ds and dc is completed, the flicker detection unit 205 increments cnt in step S611, and returns the process to step S603 so as to process the next evaluation value.

When the process is completed for the N evaluation values, the process proceeds to step S612, and wt_sin at that point in time is stored in wt. The stored wt is used to calculate wt_sin and wt_cos in step S605 in the following frame. It should be noted that wt is initialized to 0 when the camera is started.

In step S613, the flicker detection unit 205 obtains the sum of squares of ds and dc, and sets the sum as the flicker level F. The camera control unit 108 determines, in step S614, whether or not frames in which F exceeds Th2 have continued for Th1 frames, and if the condition is not satisfied, the camera control unit 108 stores the fact that the frame is in a flicker undetected state in step S615, and then ends the flicker frequency detection processing (step S408) of the frame.

If the condition is satisfied in step S614, the flicker detection unit 205 stores the fact that the frame is in a flicker detected state in step S616, and then ends the flicker frequency detection processing (step S408) of this frame.

As described above, according to the present embodiment, flicker can be detected while suppressing an increase in the hardware configuration and the memory in the image capturing mode in which different exposure conditions such as HDR moving images are consecutively captured. It is also possible to detect flicker using one flicker detector using only images of the same exposure condition, but this method reduces the number of frames used for detecting flicker. Since the reliability becomes higher the more the same flicker frequency is stably detected in a plurality of frames, if flicker detection is performed using all the captured frames as in the present embodiment, it is possible to detect the flicker frequency with higher reliability more quickly.

Note, in the present embodiment, the reference frame is set as a properly exposed frame, and the gain adjustment process for amplifying the image signals is performed in step S404. However, the exposure condition used as the reference frame may be any of a combination of exposure conditions for HDR combining, and a process of attenuating the image signals may be performed in step S404.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-221683, filed on Nov. 27, 2018, Japanese Patent Application No. 2018-221684, filed on Nov. 27, 2018, which are hereby incorporated by reference herein in their entirety.

What is claimed is:

1. An image capturing apparatus comprising an image sensor configured to capture an image of a subject and output an image signal and at least one processor or circuit configured to function as the following units:
a dividing unit configured to vertically divide the image signal into a plurality of regions;
a detection unit configured to detect a flicker based on a signal level of each of the plurality of regions;
a control unit configured to control so as to cause a plurality of image captures with different exposure conditions to be performed using the image sensor, wherein
the detection unit, in a case where the plurality of image captures are performed, by adjusting a phase of a flicker appearing in each of the plurality of image signals obtained by the plurality of image captures, detects a flicker from the plurality of image signals.

2. The image capturing apparatus according to claim 1, wherein the detection unit, in a case where the plurality of image captures are performed, after adjusting so as to make brightnesses of the plurality of image signals obtained by the plurality of image captures to be approximately the same, detects a flicker from the plurality of adjusted image signals.

3. The image capturing apparatus according to claim 1, wherein the detection unit adjusts a phase of a flicker in the plurality of image signals based on a difference in read time and frame rate of the signals for each of the plurality of image captures.

4. The image capturing apparatus according to claim 3, wherein the detection unit, by calculating a phase of a flicker that advances during a time of the difference in read time and frame rate of the signals for each of the plurality of image captures, adjusts a phase of the flicker in the plurality of image signals.

5. The image capturing apparatus according to claim 3, wherein the detection unit adjusts a phase of the flicker in the plurality of image signals based on a difference in accumulation time for each of the plurality of image captures.

6. The image capturing apparatus according to claim 5, wherein the detection unit, by calculating a phase of a flicker that advances during a time of the difference in accumulation time for each of the plurality of image captures, adjusts the phase of flicker in the plurality of image signals.

7. The image capturing apparatus according to claim 5, wherein the detection unit corrects a difference in signal levels of the plurality of image signals based on the difference in accumulation times for each of the plurality of image captures, and detects the flicker from the plurality of image signals.

8. The image capturing apparatus according to claim 7, wherein the at least one processor or circuit is configured to further function as
a combining unit configured to combine HDR (High Dynamic Range) images by combining a plurality of image signals having different brightnesses obtained by the plurality of image captures.

9. The image capturing apparatus according to claim 1, wherein the control unit performs the plurality of image captures, changing an accumulation time or a sensitivity for each image capture of the plurality of image captures.

10. A method for controlling an image capturing apparatus comprising an image sensor configured to capture an image of a subject and output image signals, the method comprising:
vertically dividing the image signals into a plurality of regions;
detecting a flicker based on a signal level of each of the plurality of regions;
controlling so as to cause a plurality of image captures with different exposure conditions to be performed using the image sensor, wherein
in the detecting, in a case where the plurality of image captures are performed, by adjusting a phase of a flicker appearing in each of the plurality of image signals obtained by the plurality of image captures, a flicker from the plurality of image signals is detected.

11. A non-transitory computer-readable storage medium storing a program for causing a computer to execute each step of a method of controlling an image capturing apparatus comprising an image sensor for capturing an image of a subject and outputting image signals, the method comprising:
vertically dividing the image signals into a plurality of regions;
detecting flicker based on a signal level of each of the plurality of regions;
controlling so as to cause a plurality of image captures with different exposure conditions to be performed using the image sensor, wherein
in the detecting, in a case where the plurality of image captures are performed, by adjusting a phase of a flicker appearing in each of the plurality of image signals obtained by the plurality of image captures, a flicker from the plurality of image signals is detected.

* * * * *